United States Patent [19]

Teramachi

[11] Patent Number: 4,693,040
[45] Date of Patent: Sep. 15, 1987

[54] SIMULTANEOUSLY GROUND TYPE BEARING BODY AND UNLIMITED SLIDING BEARING UNIT EMPLOYING THE SAME

[76] Inventor: Hiroshi Teramachi, 2-34-8, Higashi-Tamagawa, Setagaya-Ku, Tokyo, Japan

[21] Appl. No.: 851,300

[22] Filed: Apr. 7, 1986

Related U.S. Application Data

[63] Continuation of Ser. No. 688,642, Jan. 4, 1985, abandoned, which is a continuation of Ser. No. 519,858, Aug. 3, 1983, abandoned.

[30] Foreign Application Priority Data

Oct. 9, 1982 [JP] Japan ................................ 57-178162

[51] Int. Cl.$^4$ .......................... B24B 1/00; F16L 33/64
[52] U.S. Cl. .................... 51/291; 29/148.4 R;149.5 R; 384/45
[58] Field of Search ................. 51/281 R, 281 P, 290, 51/291, 105 SP; 29/148.4 R, 148.4 A:148.4 C:149.5 R; 384/43–45, 49, 50, 55

[56] References Cited

U.S. PATENT DOCUMENTS 3,879,897  4/1975  Kato ................................ 51/291 X
4,296,974  10/1981  Teramachi ............................ 384/45

Primary Examiner—Stuart S. Levy
Assistant Examiner—David Werner

[57] ABSTRACT

A bearing body of substantially U-shaped cross section has right and left skirts interposing therebetween a central cavity formed in its central lower part as well as opposite recesses formed in the inner peripheral side surfaces of the skirts. The bearing body further has several axial ball rolling surfaces provided on both sides of the recesses. The ball rolling surfaces are simultaneously ground in such a manner that grinding wheels having a thickness equal to the width of the recesses are brought into contact with the recesses, respectively, with a predetermined infeed angle. Also disclosed is an unlimited sliding bearing unit incorporating therein the above-mentioned simultaneously ground type bearing body. The bearing unit further includes a guide rail, a pair of end covers, a pair of cages and balls.

7 Claims, 19 Drawing Figures

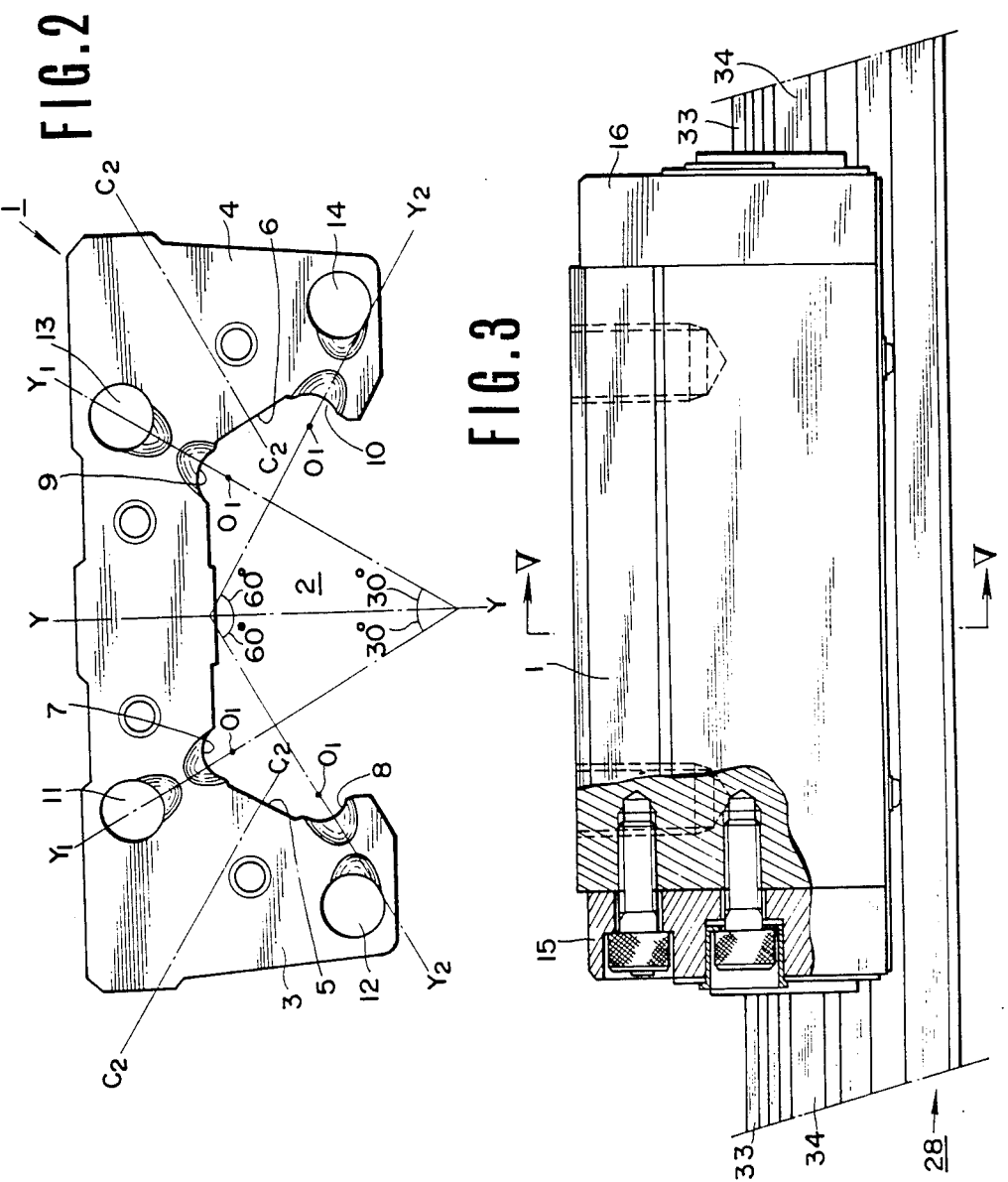

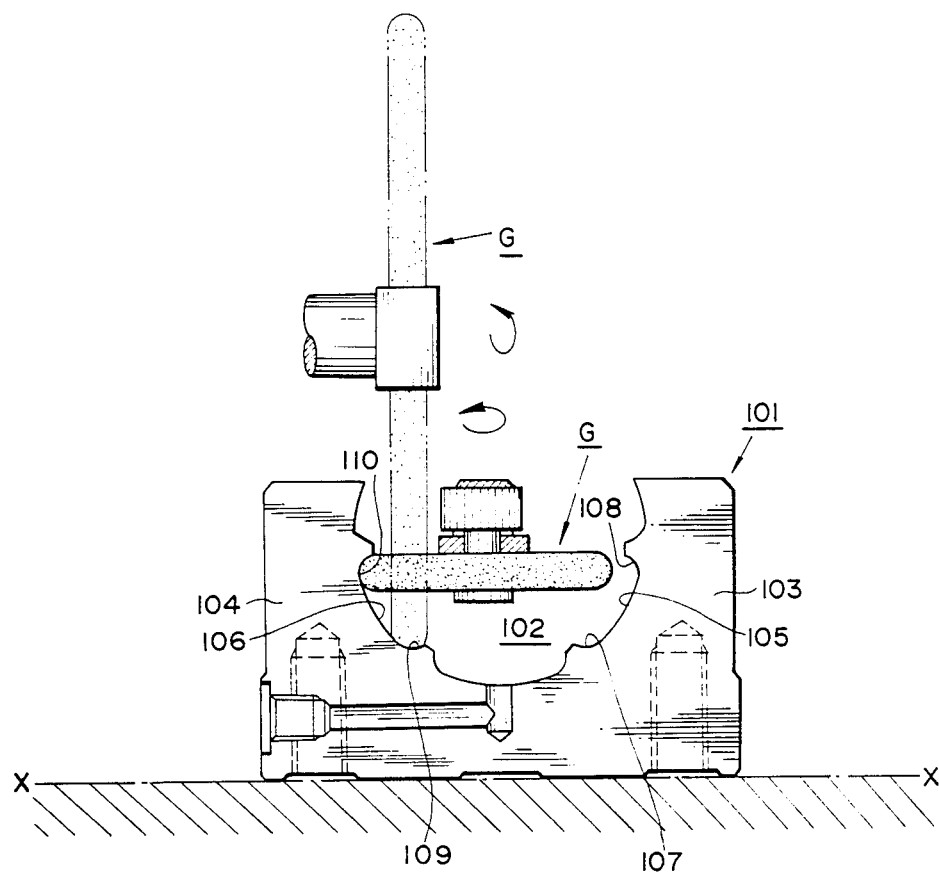

SIMULTANEOUSLY GROUND TYPE BEARING BODY AND UNLIMITED SLIDING BEARING UNIT EMPLOYING THE SAME

This application is a continuation of application Ser. No. 688,642, filed Jan. 4, 1985 now abandoned, which is a continuation of application Ser. No. 519,858 filed Aug. 3, 1983 now abandoned.

BACKGROUND OF THE INVENTION

The present invention relates to a method for manufacturing simultaneously ground type bearing body suitable for use in a table saddle of a machine tool, slide surfaces in a machining center and other transfer devices, such as robots and the like, which are adapted to make reciprocatory sliding motion while carrying heavy loads. The invention also pertains to an unlimited sliding bearing unit employing the simultaneously ground type bearng body.

In a typical conventional unlimited sliding bearing unit, as shown in FIG. 19, a pair of recesses 105, 106 are formed on the right and left (as viewed in FIG. 19) of a central cavity 102 of a bearing body 101 by means of broaching. In addition, two ball rolling surfaces 107, 108 are formed on both side surfaces of the recess 105, while two ball rolling surfaces 109, 110 are formed on both side surfaces of the recess 106. Then, the ball rolling surfaces 107, 108, 109, 110 are hardened to produce the bearing body 101. Since the ball rolling surfaces 107, 108, 109, 110 may be distorted owing to heating in the hardening, however, the ball rolling surfaces are generally finished by means of grinding employing a grind stone to obtain a required demensional accuracy.

The conventional grinding for finish is such that, as shown in FIG. 19, the ball rolling surfaces 108, 110 closer to the upper sides of the right and left skirts 103, 104 are first ground successively by means of a grinding wheel G which revolves with its axis of rotation placed vertically, and then, the ball rolling surfaces 107, 109 closer to the lower sides of the right and left skirts 103, 104 are successively ground by means of a grinding wheel G which revolves with its axis of rotation placed horizontally. The prior art, however, is not suitable for mass production, since four steps are required for the grinding operation. Moreover, owing to the individual grinding for each of the four ball rolling surfaces, it is difficult to uniformly grind all the ball rolling surfaces to close tolerances. In consequence, in order to obtain required dimensions with high accuracy, an impractically long time is needed for the grinding operation, which constitutes one of factors in a high cost. If a required dimensional accuracy cannot satisfactorily be obtained, e.g., if the infeed of the grinding wheel is excessive, there will be play between the ball rolling surfaces on the bearing body and the corresponding ball rolling surfaces formed on the associated guide rail when balls are recirculated through the passageways defined by these ball rolling surfaces, resulting in various problems, such as a poor torque transmission, the generation of noise and the inclination of the bearing body. If the infeed of the grinding wheel is insufficient, on the other hand, it becomes difficult to insert balls into the space defined between the ball rolling surfaces on the bearing body and the corresponding ball rolling surfaces on the guide rail. In addition, after the insertion of the balls, the movement of the balls becomes stiff due to an increase in resistance to sliding, which makes it impossible to obtain a smooth traveling of the bearing unit disadvantageously.

Summary of the Invention:

Accordingly, it is an object of the invention to provide a method for manufacturing a simultaneously ground type bearing body which can be mass-produced at low cost and has ball rolling surfaces finished with high accuracy, by not only simultaneously grinding two opposite ball rolling surfaces disposed on either one of the sides of the central cavity but also simultaneously grinding a total of four ball rolling surfaces disposed on both the sides of the central cavity.

It is another object of the invention to provide a method for manufacturing a bearing unit improved to increase its torque transmitting capacity as well as perform a noiseless, smooth traveling, by incorporating the above-mentioned simultaneously ground type bearing body as a constituent element thereof.

Above and other objects, features and advantages of the invention will become apparent from the following description taken in connection with the accompanying drawings.

BRIEF DESCRIPTION OF THE DRAWINGS

FIG. 2 is a front elevational view of the bearing body ground simultaneously in accordance with the invention;

FIG. 3 is a partly-sectioned side elevational view of a first embodiment of an unlimited sliding bearing unit in accordance with the invention incorporating therein the simultaneously ground type bearing body;

FIG. 19 illustrates how the conventional individually ground type bearing body is machined.

DESCRIPTION OF THE PREFERRED EMBODIMENTS

The invention will be described hereinunder through illustrated embodiments.

Figure 1:
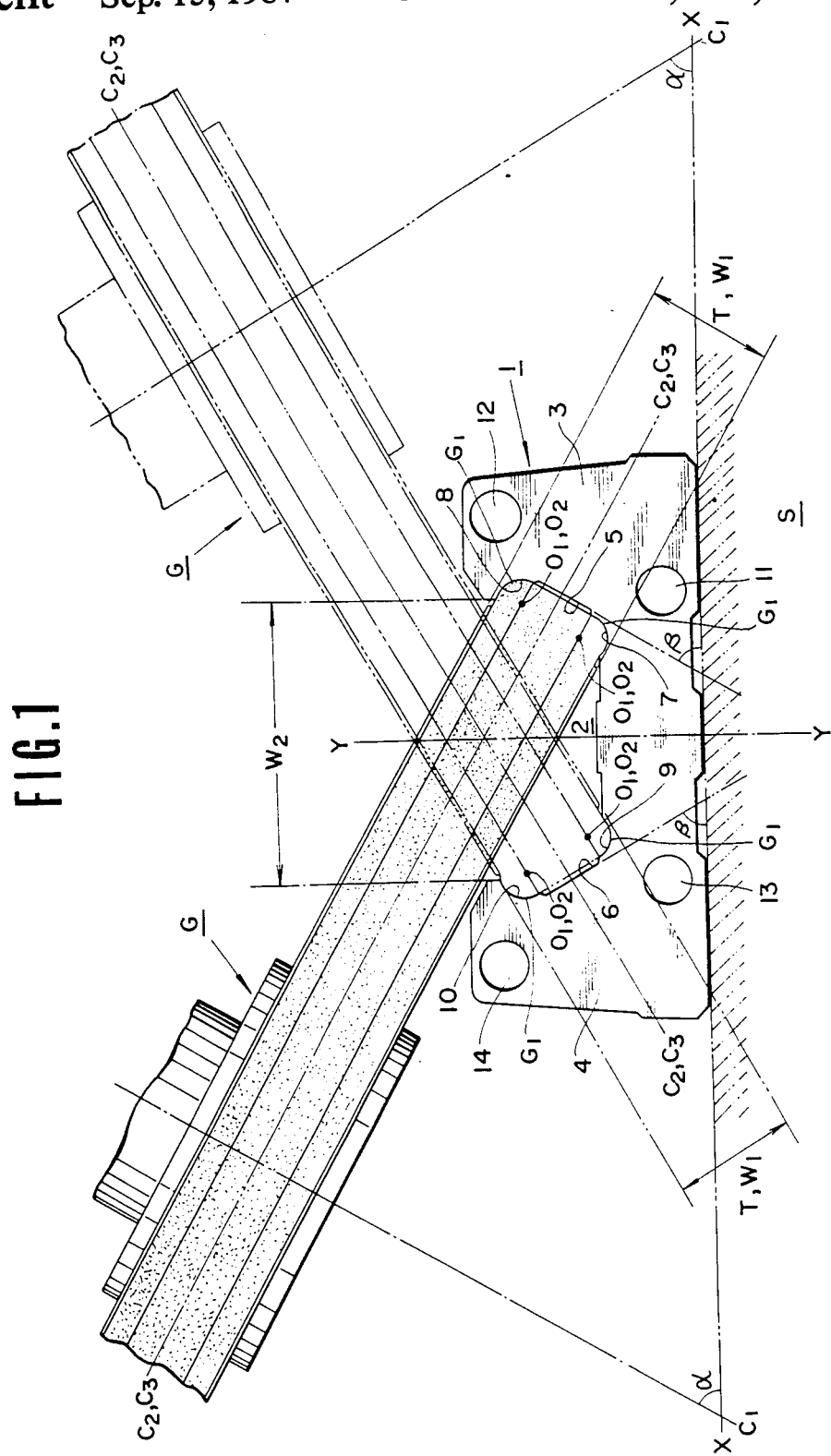
FIG. 1 illustrates how a bearing body in accordance with the invention is simultaneously ground by means of grinding wheels.
Figure 4:
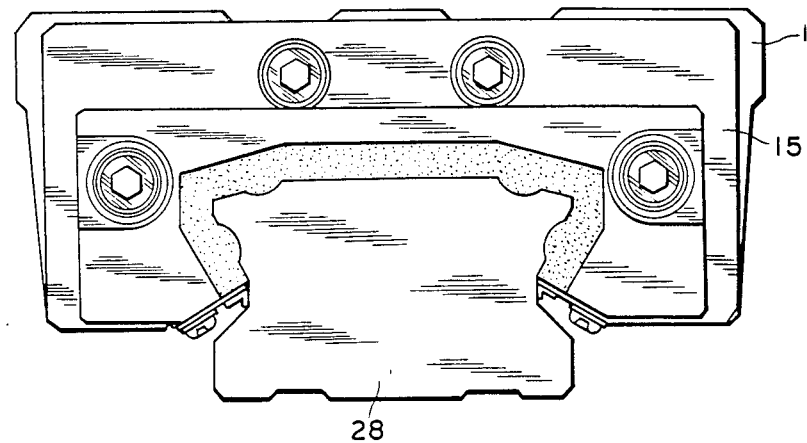
FIG. 4 is a front elevational view of the unlimited sliding bearing unit shown in FIG. 3.
Figure 5:
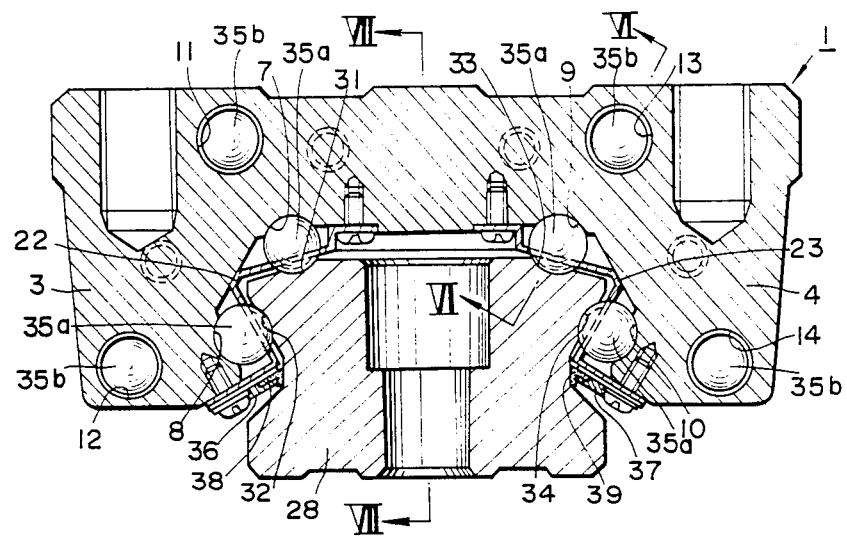
FIG. 5 is a transverse sectional view taken along the line V—V of FIG. 3.
Figure 6:
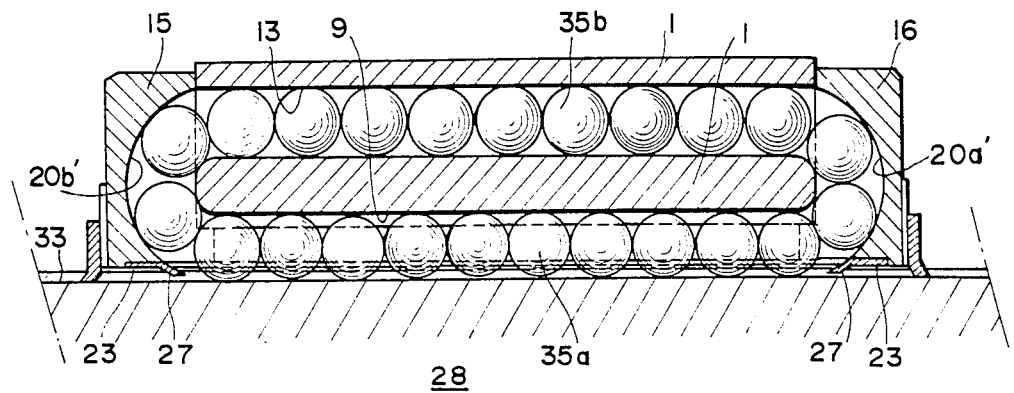
FIG. 6 is a longitudinal sectional view taken along the line VI—VI of FIG. 5, showing an essential part of the unlimited sliding bearing unit.
Figure 7:
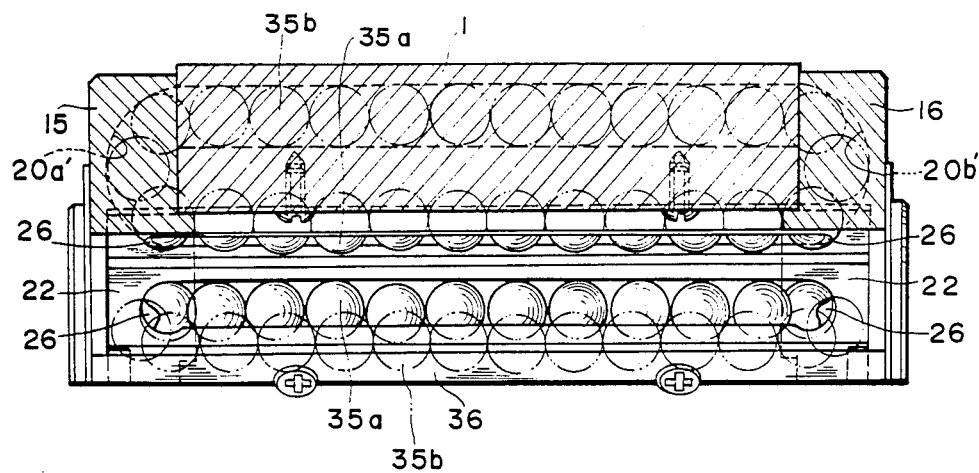
FIG. 7 is a longitudinal sectional view taken along the line VII—VII of FIG. 5, showing the state where a guide rail is removed.
Figure 8:
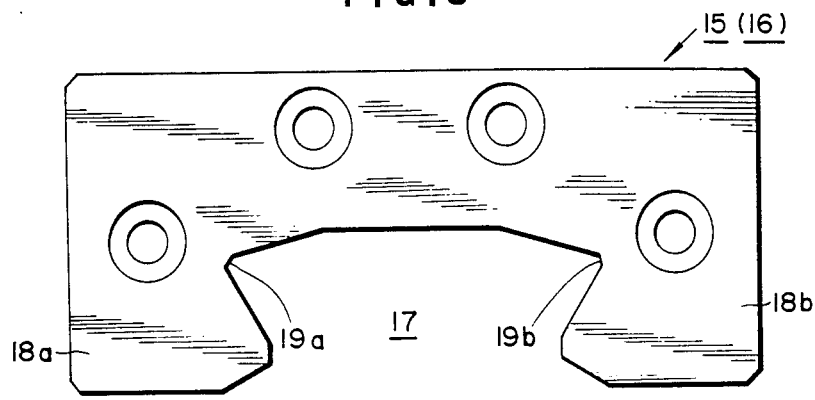
FIG. 8 is a front elevational view showing the exterior of an end cover as a constituent element of the unlimited sliding bearing unit in accordance with the invention.
Figure 9:
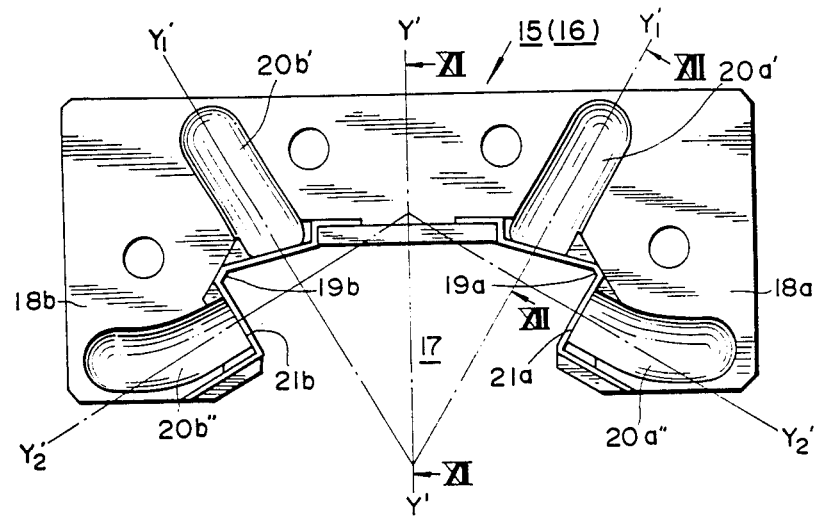
FIG. 9 is a front elevational view showing the interior of the end cover shown in FIG. 8.
Figure 10:
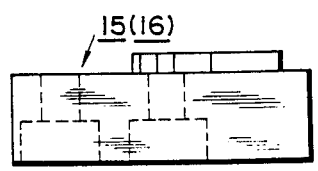
FIG. 10 is a side elevational view of the end cover shown in FIG. 9 as viewed from the left-hand side thereof.
Figure 11:
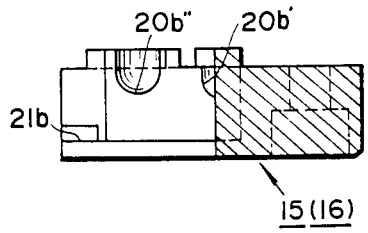
FIG. 11 is a longitudinal sectional view taken along the line XI—XI of FIG. 9.
Figure 12:
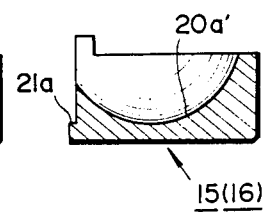
FIG. 12 is an end view taken along the line XII—XII of FIG. 9.
Figure 13:
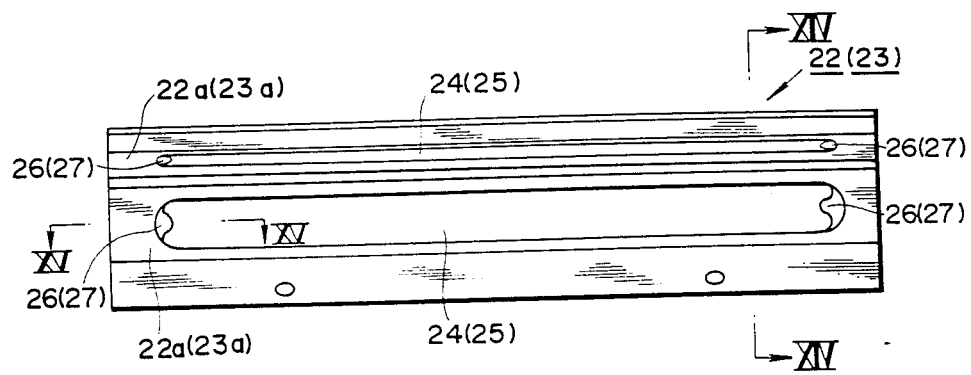
FIG. 13 is a side elevational view of a cage as a constituent element of the unlimited sliding bearing unit in accordance with the invention.
Figure 14:
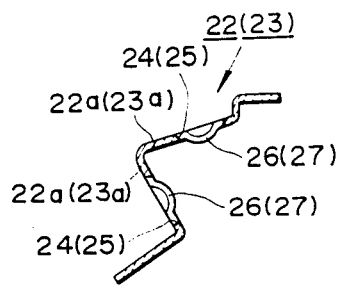
FIG. 14 is a transverse sectional view taken along the line XIV—XIV of FIG. 13.
Figure 15:
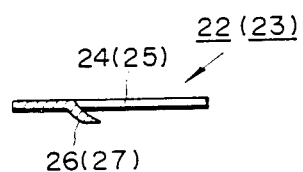
FIG. 15 is a longitudinal sectional view taken along the line XV—XV of FIG. 13, showing an essential part of the cage.
Figure 16:
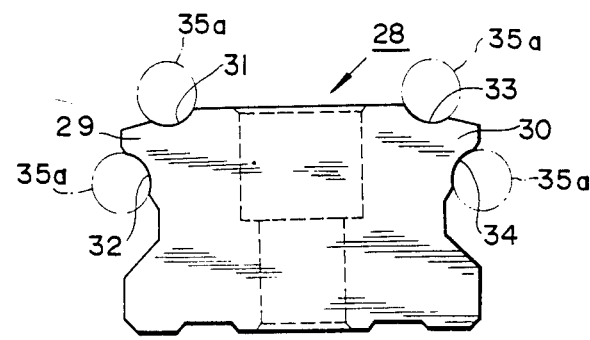
FIG. 16 is a front elevational view of a guide rail as a constituent element of the unlimited sliding bearing unit in accordance with the invention.
Figure 17:
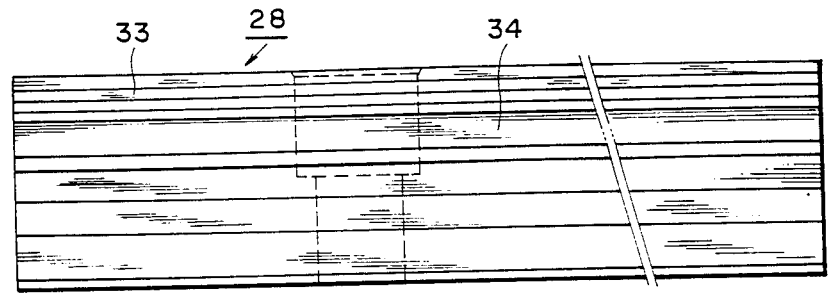
FIG. 17 is a side elevational view of the guide rail shown in FIG. 16.

Referring first to FIGS. 1 and 2, which in combination show a simultaneously ground type bearing body in accordance with the invention and a method of grinding the same, a reference numeral 1 denotes the whole of a bearing body, which is constituted by a block body of substantially U-shaped cross section. The bearing body 1 has a substantially rectangular central cavity 2 formed in its central lower part, as well as left and right skirts 3, 4 interposing the central cavity 2 therebetween.

Recesses 5, 6 of substantially trapezoidal cross section are formed in bilaterally symmetry in the inner peripheral side surfaces of the respective skirts 3, 4. Ball rolling surfaces 7, 8, 9, 10 each having a radius of curvature substantially equal to the radius of balls are formed in both corners of the recesses 5, 6 so as to axially extend over the entire length of the bearing body 1. As shown in FIG. 2, the upper ball rolling surfaces 7, 9 of these ball rolling surfaces 7, 8, 9, 10 are disposed so that the curvature center $0_1$ thereof is set on an intersecting line $Y_1$ having an angle of 30 degrees with respect to a vertical line Y—Y which passes through the center of the bearing body 1. On the other hand, the lower ball rolling surfaces 8, 10 are disposed so that the curvature center $0_1$ thereof is set on an intersecting line $Y_2$ having an angle of 60 degrees with respect to the vertical line Y—Y.

In the simultaneously ground type bearing body in accordance with the invention, the ball rolling surfaces 7, 8, 9, 10 are simultaneously ground by the following method. Namely, as shown in FIG. 1, first, the bearing body 1 is mounted on a flat machining reference surface S, with the opening side of the central cavity 2 directed upwardly. Then, a pair of grinding wheels G, G each having a thickness T as well as grinding edges $G_1$ previously dressed to have a curvature equal to that of balls are advanced into the central cavity 2 with an infeed angle $\alpha$ (about 55 to about 65 degrees), which is an angle made by each of rotational center lines $C_1$, $C_1$ thereof and a horizontal line X—X defined by the upper surface of the machining reference surface S. In this case, the grinding wheels G, G are disposed so as to be out of phase with each other in the longitudinal direction of the bearing body 1 as well as opposite in infeed direction to each other. Thus, the outer peripheral side edges of the grinding wheels G, G are fitted into the recesses 5, 6 in the left and right skirts 3, 4 to simultaneously grind two pairs of ball rolling surfaces 7, 8 and 9, 10, each pair being constituted by two opposite ball rolling surfaces formed in both corners of each of the recesses 5, 6.

In such a case, the bottom surface of each of the recesses 5, 6 has a predetermined inclination angle $\beta$ (about 55 to about 65 degrees) with respect to the horizontal line X—X, and the infeed angle $\alpha$ of each grinding wheel G is set so as to be equal to the inclination angle $\beta$ of the bottom surface of each of the recesses 5, 6. In the illustrated embodiment, both the infeed angle $\alpha$ and the inclination angle $\beta$ are selected to be 60 degrees. Moreover, the thickness T of each grinding wheel G is made coincide with width $W_1$ of each of the recesses 5, 6. Therefore, if the pair of grinding wheels G, G are fitted into the respective recesses 5, 6 in the opposite directions while the center lines $C_2$, $C_2$ of the respective recesses 5, 6 are made coincide with the thicknesswise center lines $C_3$, $C_3$ of the corresponding grinding wheels G, G, then the curvature center $0_1$ of each of the ball rolling surfaces 7, 8, 9, 10 and the curvature center $0_2$ of the grinding edge $G_1$ of the corresponding grinding wheel G automatically coincide with each other. Accordingly, the curvature center portion and other round portions of each of the ball rolling surfaces 7, 8, 9, 10 can be accurately machined by a simple method.

As mentioned above, in the simultaneously ground type bearing body in accordance with the invention, the angle made by the bottom surface of each of the recesses 5, 6 and the horizontal line X—X, i.e., the inclination angle $\beta$ is selected to fall between about 55 and about 65 degrees. This is because, as will be clear from the figures, each grinding wheel G employed in the invention is constituted by a large grind stone having a diameter considerably larger than the diameter $W_2$ of the opening of the bearing body 1; hence, the setting of the inclination angle $\beta$ within the above-mentioned range makes it possible to prevent the grinding wheels G from interfering with the skirts 3, 4 as well as to grind each ball rolling surface with an angle most preferable for increasing the load bearing capacity of the bearing body 1 against a lifting load applied thereon.

Four ball return bores 11, 12, 13, 14 are formed extending through the skirts 3, 4 of the bearing body 1 in the axial direction thereof and in parallel to the ball rolling surfaces 7, 8, 9, 10. Each ball return bore defines a passageway for non-loaded balls. The four ball return bores 11, 12 and 13, 14 are disposed in symmetry with respect to the center lines $C_2$, $C_2$ of the recesses 5, 6, respectively, and each of the ball return bores 11, 12, 13, 14 pairs with the corresponding one of the ball rolling surfaces 7, 8, 9, 10 in the mutual one of the areas divided by the center lines $C_2$, $C_2$. Thereby, a total of four ball recirculating passageways are formed by the ball return bores and the ball rolling surfaces corresponding to each other. In addition, the ball return bores 11, 12, 13, 14 as passageways for non-loaded balls are formed slightly larger in diameter than the balls so that they roll easily.

In the simultaneously ground type bearing body in accordance with the invention, as described above, the four ball rolling surfaces can simultaneously be ground simply by fitting a pair of grinding wheels made out of phase with each other into the recesses disposed on both sides of the central cavity in the opposite directions. Therefore, only one step is required to finish all the four ball rolling surfaces with a necessary dimensional accuracy, so that it becomes possible to mass-produce the bearing body, and a lower cost product can be supplied. In addition, unlike the individual grinding, the simultaneous grinding of the ball rolling surfaces permits a constant dimensioning for the ball rolling surfaces, i.e., the ball rolling surfaces can be formed with the same curvature and the same curvature center. Therefore, the bearing body is greatly improved in dimensional accuracy compared with the prior art.

FIGS. 3 to 17 in combination show a first embodiment of an unlimited sliding bearing unit employing the above-described simultaneously ground type bearing body. Of the figures, FIGS. 3 to 7 show the construction of the whole bearing unit, while FIGS. 8 to 17 show the constructions of various components thereof. Since a reference numeral 1 in the figures denotes the bearing body as mentioned hereinbefore, various portions of the bearing body are represented by the same reference numerals as those in FIGS. 1 and 2, and the description of the construction thereof is omitted.

In the figures, reference numerals 15, 16 designate end covers attached to the front and rear end surfaces of the bearing body 1 by such fixing means as bolts and the like. The end covers are manufactured by injection molding from a synthetic resin material or die casting from a die casting alloy. Since the end covers 15, 16 have the same arrangement, the construction of one of them, the end cover 15, will be described hereinunder.

The end cover 15 of substantially U-shaped cross section has a substantially rectangular central cavity 17 formed in its central lower part and is provided with left and right skirts 18a, 18b formed interposing the central cavity 17 therebetween as well as bilaterally symmetrical recesses 19a, 19b formed in the inner peripheral end edges of the respective skirts 18a, 18b, thereby to have a configuration substantially similar to the inner peripheral configuration of the bearing body 1. The end cover 15 further has in its inner surface U-shaped ball turning grooves 20a', 20a" and 20b', 20b" which are formed so as to curve axially outward. The positional relationship among the U-shaped ball turning grooves 20a', 20a" and 20b', 20b" will be explained hereinunder in further detail.

The upper U-shaped ball turning grooves 20a', 20b' have their starting ends set on respective intersecting lines Y'$_1$ each having an angle of 30 degrees with respect to a vertical line Y'—Y' which passes through the center of the end cover and coincides with the vertical line Y—Y which passes through the center of the bearing body 1. The lower U-shaped ball turning grooves 20a", 20b", on the other hand, have their starting ends set on respective intersecting lines Y'$_2$ each having an angle of 60 degrees with respect to the vertical line Y'—Y'. The U-shaped ball turning grooves extend along the respective intersecting lines Y'$_1$, Y'$_2$ outwardly in the thicknesswise direction of the end cover until they terminate at positions which coincide with the axial ends of the ball return bores 11, 12, 13, 14 in the bearing body 1, respectively.

To sum up, the U-shaped ball turning grooves 20a', 20a" and 20b', 20b" have their starting ends communicated with the ball rolling surfaces 7, 8, 9, 10 as well as their terminating ends communicated with the ball return bores 11, 12, 13, 14, respectively. Accordingly, the end cover 15 with the U-shaped ball turning grooves provides communication between the front sides of the ball rolling surfaces 7, 8, 9, 10 and those of the ball return bores 11, 12, 13, 14 corresponding to each other. On the other hand, the other sides of the ball rolling surfaces 7, 8, 9, 10 and those of the ball return bores 11, 12, 13, 14 are intercommunicated by the other end cover 16 having the same construction as that of the end cover 15. Thus, one of ball recirculating passageways is formed by, e.g., one ball rolling surface 7 and one ball return bore 11.

Reference numerals 21a, 21b denote retainer grooves formed in the inner surface of one end cover 15, with a predetermined depth. The retainer grooves 21a, 21b are formed so that their intermediate portions cross the starting ends of the U-shaped ball turning grooves 20a', 20a" and 20b', 20b", respectively. It is to be understood that the other end cover 16 is provided in its inner surface retainer grooves (not shown) having the same construction as that of the retainer grooves 21a, 21b.

Reference numerals 22, 23 designate a pair of cages for guiding the rolling loaded balls. The cage 22, 23 has in its inner slant surfaces 22a, 23a slits 24, 25 having such a size that the balls will not come off, as well as tongues 26, 27 formed on both ends of each of these slits. These tongues 26, 27 are adapted to scoop the balls rolling along the ball rolling surfaces 7, 8, 9, 10 and then feed them into the U-shaped ball turning grooves 20a', 20a" and 20b', 20b"..., thereby permitting a smooth change of the running direction of the balls from the linear direction to the rotational direction. The pair of cages 22, 23 have both end portions thereof engaged by the retainer grooves 21a, 21b... of the end covers 15, 16 so as to be secured to the end covers 15, 16. As described above, these tongues 26, 27 are adapted to guide the balls so that the running direction thereof is smoothly changed from the linear direction to the rotational direction; hence, the strength and rigidity of the tongues 26, 27 are exceedingly important. Therefore, it is desirable to subject the cages 22, 23 to heat treatment such as tufftride and the like thereby to increase the rigidity thereof.

Moreover, when the cages 22, 23 are fitted in the bearing body 1 and both ends of the cages 22, 23 are secured by the end covers 15, 16, the axes of the slits 24, 25 and the axes of the corresponding ball rolling surfaces 7, 8, 9, 10 should be on the same straight lines, respectively.

A reference numeral 28 denotes a guide rail received by the central cavity 2 in the bearing body 1 and the central cavities 17 of the respective end covers 15, 16. The guide rail 28 is mounted on a movable or fixed part of a machine tool or the like by employing fixing means such as bolts and the like. The guide rail 28 has axial ridges 29, 30 formed on the upper left and right sides thereof. On both sides of these ridges 29, 30, ball rolling surfaces 31, 32, 33, 34 are formed which correspond to the ball rolling surfaces 7, 8, 9, 10 formed on the bearing body 1 and have a radius of curvature substantially equal to the radius of the balls.

A reference numeral 35 designates balls adapted to recirculate being interposed between the bearing body 1 and the guide rail 28. The balls 35 include loaded balls 35a which roll along the passageways defined between the ball rolling surfaces 7, 8, 9, 10 on the bearing body 1 and the ball rolling surfaces 31, 32, 33, 34 on the guide rail 28 corresponding to each other while being loaded, and non-loaded balls 35b which roll along the ball return bores 11, 12, 13, 14 formed in the bearing body 1. Thus, the same ball 35 is referred to as "loaded ball 35a" when the same rolls in the loaded region and referred to as "non-loaded ball 35b" when the same rolls in the non-loaded region.

It is to be noted that reference numerals 36, 37 denote axial seal plates having seals 38, 39 secured to their respective outer side surfaces by firing. By attaching the axial seal plates 36, 37 to the inner lower slant surfaces of the respective skirts 3, 4 of the bearing body 1, it is possible to prevent foreign matter from entering the inside of the bearing body 1 from the lower side thereof.

Figure 18:
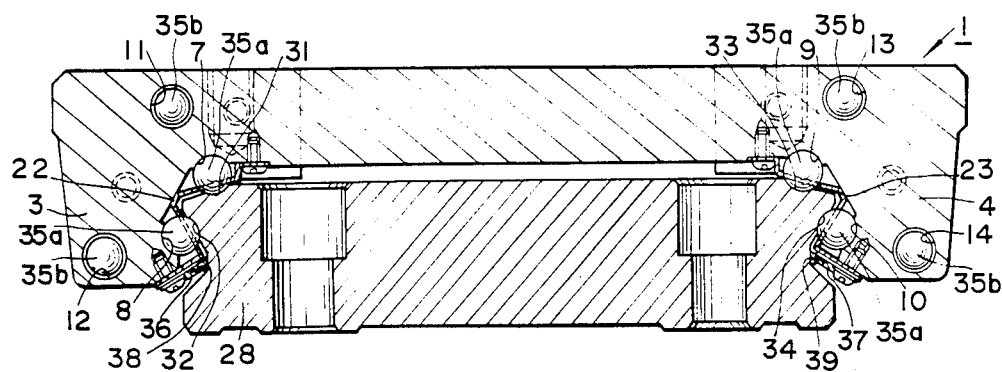
FIG. 18 is a transverse sectional front elevational view of a second embodiment of the unlimited sliding bearing unit in accordance with the invention.

FIG. 18 shows another embodiment of the unlimited sliding bearing unit in accordance with the invention. The second embodiment differs from the first embodiment only in that the bearing body 1 and the guide rail 28 are extended in the widthwise direction thereof. Accordingly, the same portions and members of the second embodiment as those in the first embodiment are represented by the same reference numerals, and the description thereof is omitted.

The operation of the unlimited sliding bearing unit having the construction described above will be explained hereinunder.

The bearing unit in accordance with the invention is mounted on the guide rail 28 of a machining center (not shown), for instance, and a necessary instrument or device is set on the bearing body 1. Then, when the bearing unit is moved either forward or rearward, the loaded balls 35a being clamped in the loaded ball passageways defined by the ball rolling surfaces 7, 8, 9, 10 on the bearing body 1 and the corresponding ball rolling surfaces 31, 32, 33, 34 on the guide rail 28 respectively run in one direction while being guided by the cages 22, 23. Then, after being scooped by the tongues 26, 27 formed on one side of the cages 22, 23, the loaded balls 35a are changed in course from the linear direction to the rotational direction by the U-shaped ball turning grooves 20a', 20a" and 20b', 20b" formed in the end cover 15 and are then fed into the non-loaded ball passageways defined by the ball return bores 11, 12, 13, 14 formed in the bearing body 1 to become the non-loaded balls 35b. Thereafter, the non-loaded balls 35b emerging from the ball return bores 11, 12, 13, 14 as the non-loaded ball passageways are changed in course from the linear direction to the rotational direction by the U-shaped ball turning grooves 20a', 20a" and 20b', 20b" formed in the other end cover 16 opposite to the end cover 15 and are then returned into the loaded ball passageways defined by the ball rolling surfaces 7, 8, 9, 10 on the bearing body 1 and the ball rolling surfaces 31, 32, 33, 34 on the guide rail 28 to become the loaded balls 35a again. Thereafter, the balls 35 repeat the aligned recirculation through the similar movement.

The unlimited sliding bearing unit of the invention having the construction and operation described above offers the following advantages. Namely, the bearing unit has the simultaneously ground type bearing body incorporated therein as a constituent element thereof, and moreover, the ball rolling surfaces formed on the simultaneously ground type bearing body have an extremely high dimensional accuracy. Therefore, there will be not play between the ball rolling surfaces on the bearing body and those on the guide rail. Accordingly, when the balls are recirculated being aligned with each other, it is possible to effect an excellent torque transmission by the loaded balls as well as prevent any local wear of the ball rolling surfaces. Moreover, since there is no play between the ball rolling surfaces, it is possible to move the bearing body without any noises while maintaining the same to be horizontal. Furthermore, since the ball rolling surfaces of the bearing body can be finished with high accuracy, a uniform pressure will be applied to the ball rolling surfaces when the balls roll, thereby making it possible to prevent any unexpected increase in resistance to sliding. Accordingly, it is possible to guarantee a smooth traveling of the bearing body, and the bearing unit as a whole is greatly improved in traveling performance.

Although the invention has been described through specific terms, it is to be noted here that the described embodiments are not exclusive and various changes and modifications may be imparted thereto without departing from the scope of the appended claims which is limited solely by the appended claims.

What is claimed is:

1. A method of manufacturing a bearing body of substantially U-shaped cross section having a mounting surface formed on its top and a central cavity defined in its central lower part by a cavity lower surface and two skirts having opposed inner peripheral side surfaces, said method comprising the steps of forming a pair of opposite recesses in the inner peripheral side surfaces of said skirts, each of said recess having a bottom surface inclined at an angle of about 55 degeees to about 65 degrees relative to said mounting surface and a pair of opposite side surfaces extending inwardly from said bottom surface, and simultaneously grinding the opposite sides of each recess by using a grinding wheel having a diameter greater than the width of said cavity at said cavity lower surface and a thickness equal to the width of the recess to be ground so as to form a pair of longitudinally extending ball rolling surfaces in each recess, the grinding wheel being brought into contact with each recess with an infeed angle equal to the angle of inclination of said bottom surface of the related recess.

2. A method according to claim 1, wherein said grinding wheel is provided on its opposite sides with a pair of grinding edges each having a curvature substantially equal to that of balls intended to roll on said ball rolling surfaces.

3. A method according to claim 1, further comprising the step of simultaneously grinding the opposite sides of both said respective recesses by using a pair of grinding wheels spaced from each other in the longitudinal direction of said bearing body, said grinding wheels being brought into contact with said recesses with opposite infeed directions.

4. A method as recited in claim 1 further comprising providing axially extending non-loaded ball passageways extending through said skirts with the number of said non-loaded ball passageways being equal to the number of ball rolling surfaces and with a respective one of each non-loaded ball passageway being associated with each of said ball rolling surfaces.

5. A method as recited in claim 1 further comprising:
mounting the bearing body to be ground on a horizontal machining reference surface with the open side of said central cavity directed upwardly from said machining surface and with each said recess in said inner peripheral side surfaces having a bottom surface inclined at an angle of about 55 degrees to about 65 degrees relative to said horizontal machining reference surface.

6. A method as receited in claim 4 further comprising:
providing a guide rail having a pair of longitudinally extending ridges with a ball rolling surface formed along each longitudinal edge of each ridge;
positioning said guide rail with respect to said bearing body cavity to associate each guide rail ball rolling surface with a respective ball rolling surface of said bearing body to define loaded ball rolling passageways;
mounting a pair of end covers on the ends of said bearing body with each end cover provided with U-shaped ball return grooves for providing communication between corresponding loaded ball rolling passageway and non-loaded ball passageways.

7. A method as recited in claim 6, further comprising:
securing a pair of cages having longitudinally extending slits to said bearing body with said cages extending axially along the loaded ball rolling passageways defined between said ball rolling surfaces of said bearing body and said ball rolling surfaces of said guide rail.

* * * * *